(12) United States Patent
Kobayashi

(10) Patent No.: US 7,861,283 B2
(45) Date of Patent: Dec. 28, 2010

(54) USER POSITION UTILIZATION SYSTEM

(75) Inventor: Kazutoshi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1321 days.

(21) Appl. No.: 11/320,143

(22) Filed: Dec. 28, 2005

(65) Prior Publication Data

US 2006/0101278 A1    May 11, 2006

Related U.S. Application Data

(63) Continuation of application No. PCT/JP03/11554, filed on Sep. 10, 2003.

(51) Int. Cl.
*H04L 9/32* (2006.01)
*H04L 9/00* (2006.01)

(52) U.S. Cl. .................. 726/2; 726/3; 713/168

(58) Field of Classification Search .............. 726/1–4, 726/14–15; 380/255, 258–259; 713/155–156, 713/168, 173
See application file for complete search history.

(56) References Cited

U.S. PATENT DOCUMENTS

| 5,991,807 A * | 11/1999 | Schmidt et al. ............. 709/225 |
| 6,714,987 B1 * | 3/2004 | Amin et al. ................. 709/249 |
| 7,089,298 B2 * | 8/2006 | Nyman et al. ............... 709/220 |
| 7,249,371 B2 * | 7/2007 | Barkan et al. .................. 726/4 |

FOREIGN PATENT DOCUMENTS

| JP | 10-222522 | 8/1998 |
| JP | 11-282393 | 10/1999 |
| JP | 2001-111544 | 4/2001 |
| JP | 2001-268125 | 9/2001 |
| JP | 2002-124993 | 4/2002 |
| JP | 2003-060653 | 2/2003 |
| JP | 2003-067630 | 3/2003 |
| JP | 2003-134546 | 5/2003 |
| JP | 2003-152805 | 5/2003 |
| JP | 2003-218861 | 7/2003 |

OTHER PUBLICATIONS

International Search Report dated Oct. 21, 2003.
C. Rigney "Remote Authentication Dial in User Service (RADIUS)" Network Working Group, Jun. 2000.

* cited by examiner

*Primary Examiner*—Hosuk Song
(74) *Attorney, Agent, or Firm*—Fujitsu Patent Center

(57) ABSTRACT

A system utilizing information on a user position via an IP network. The system includes storage unit for storing information for identifying a date and time when a user terminal has become communicable in a communication area provided by a predetermined radio LAN access point, information identifying the access point, and information identifying the user, and utilization unit for utilizing the information stored in the storage unit.

5 Claims, 18 Drawing Sheets

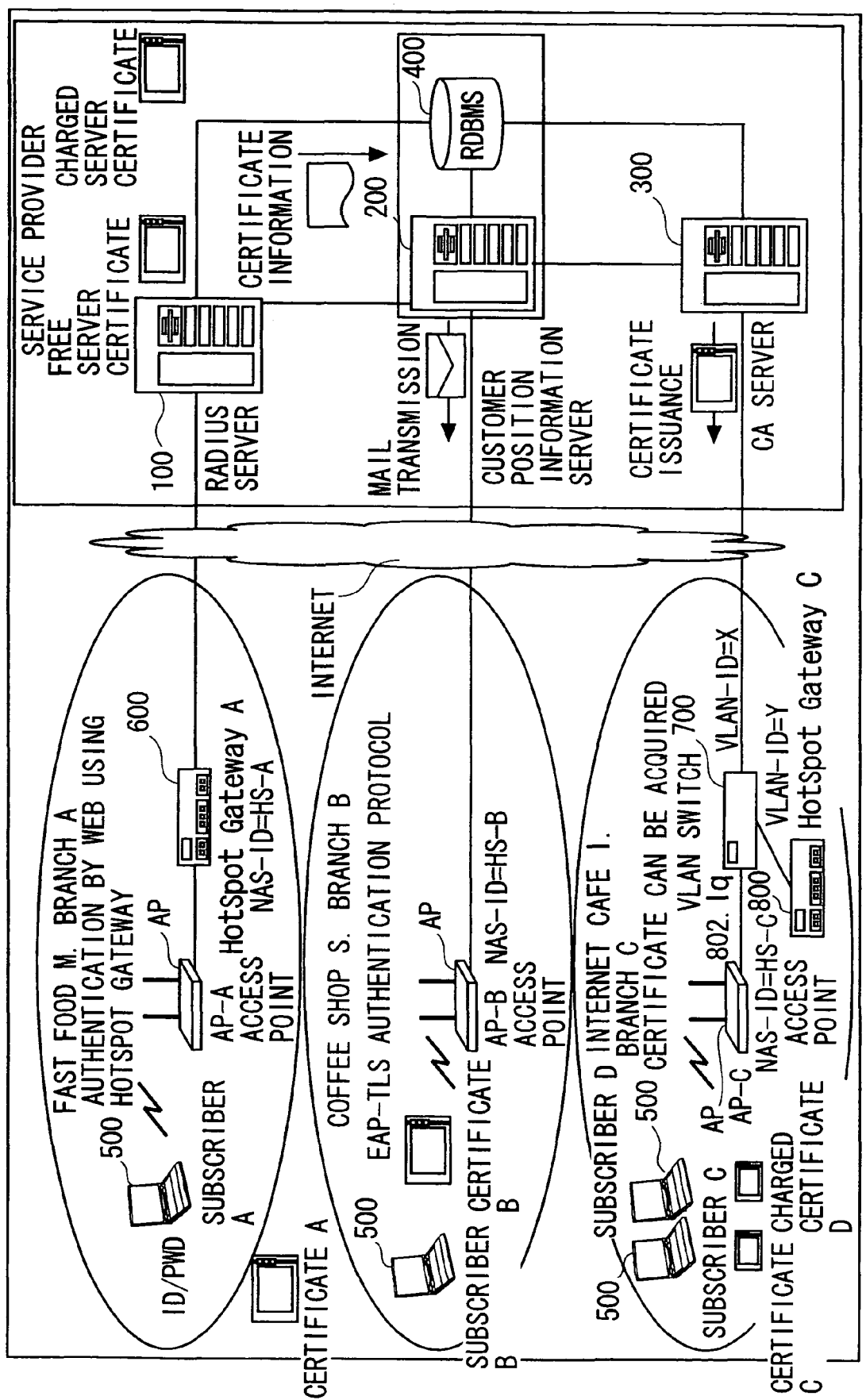

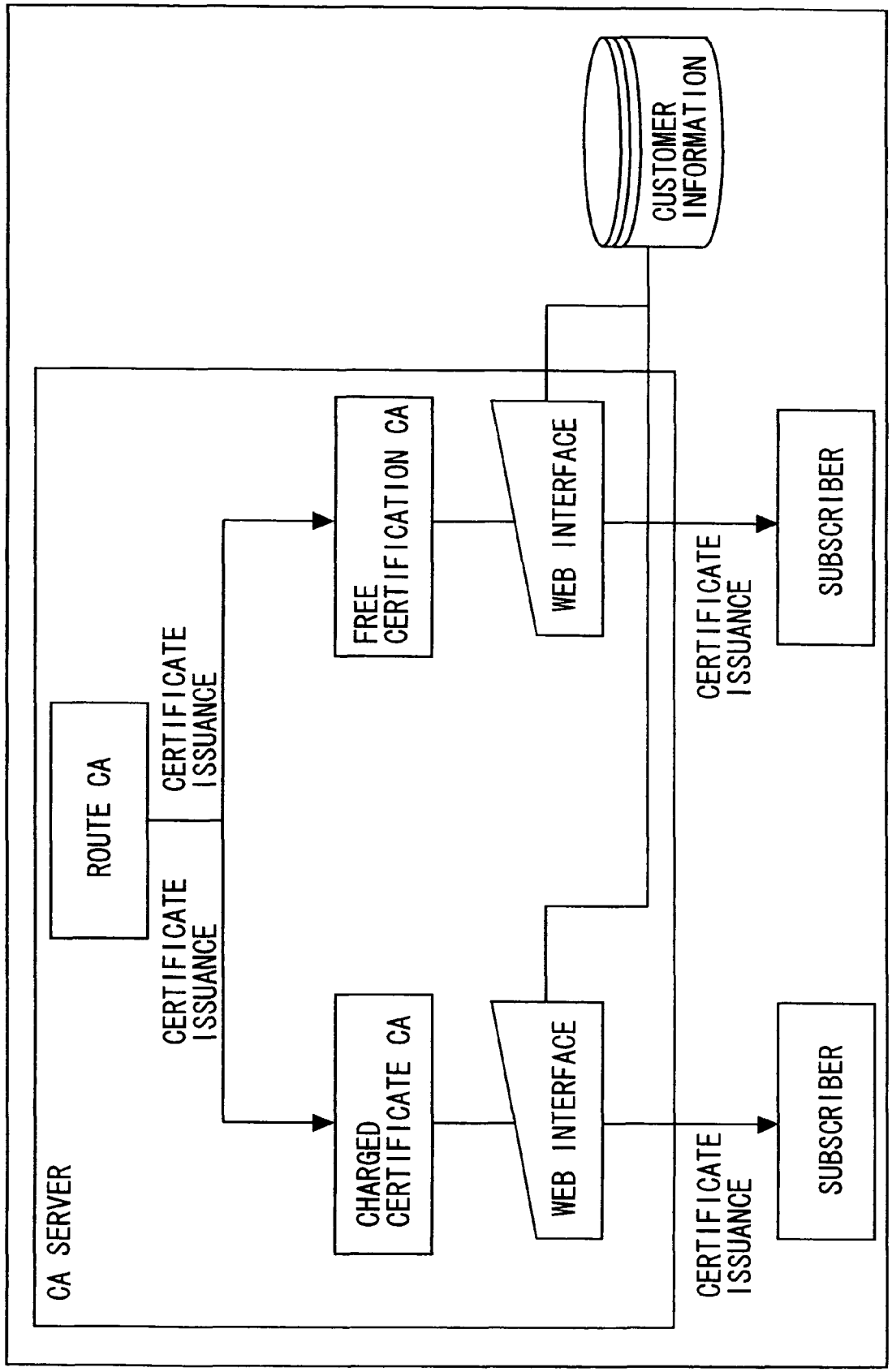

FIG. 3

| SUBSCRIBER NAME | ID | PASSWORD | SERVICE | PERIOD | RESIDENCE/MAIL ADDRESS/ACCOUNT |
|---|---|---|---|---|---|
| SUBSCRIBER A | USER A | Aaaaaaaa | CHARGED | TILL Y MONTH Y DAY | XXX/XXX@XXXX/XXXXX |
| SUBSCRIBER B | USER B | Bbbbbbbb | FREE | Null | XXX/XXX@XXXX/XXXXX |
| SUBSCRIBER C | USER C | Cccccccc | FREE | Null | XXX/XXX@XXXX/XXXXX |
| SUBSCRIBER D | USER D | Dddddddd | CHARGED | Null | XXX/XXX@XXXX/XXXXX |

FIG. 4

| CUSTOMER NAME WHO IS IN THE SHOP | DATE | NAS-ID | LOCATION |
|---|---|---|---|
| SUBSCRIBER A | X MONTH X DAY R HOUR | HS-A | FAST FOOD M. BRANCH A |
| SUBSCRIBER B | X MONTH X DAY X HOUR | HS-B | COFFEE SHOP S. BRANCH B |
| SUBSCRIBER C | X MONTH X DAY Y HOUR | HS-C | INTERNET CAFE BRANCH I-C |
| SUBSCRIBER D | X MONTH X DAY Z HOUR | HS-C | INTERNET CAFE BRANCH I-C |

FIG. 5

| NAS-ID | VLAN-ID | LIMIT | LOCATION | RATE FORM | TIME |
|---|---|---|---|---|---|
| HS-A | Null | NOTHING | FAST FOOD M. BRANCH A | CHARGED | Null |
| HS-B | Null | NOTHING | COFFEE SHOP S. BRANCH B | FREE | Null |
| HS-C | X | NOTHING | INTERNET CAFE BRANCH I-C | TIME-LIMITED FREE | 15 MINUTES |
| HS-C | Y | LIMITED | INTERNET CAFE BRANCH I-C | FREE | Null |

FIG. 6

| LOCATION | ADVERTISEMENT SERVICE | ADDITION 1 | ADDITION 2 | MAIL TEMPLATE | MANAGER INFORMATION |
|---|---|---|---|---|---|
| COFFEE SHOP S. BRANCH B | SERVICE A | Null | Null | HotSpotA-Mail1.txt | ID/PWD/ACCOUNT |
| COFFEE SHOP S. BRANCH B | SERVICE B | ELEVEN O' CLOCK | TWO DAYS | HotSpotA-Mail2.txt | ID/PWD/ACCOUNT |

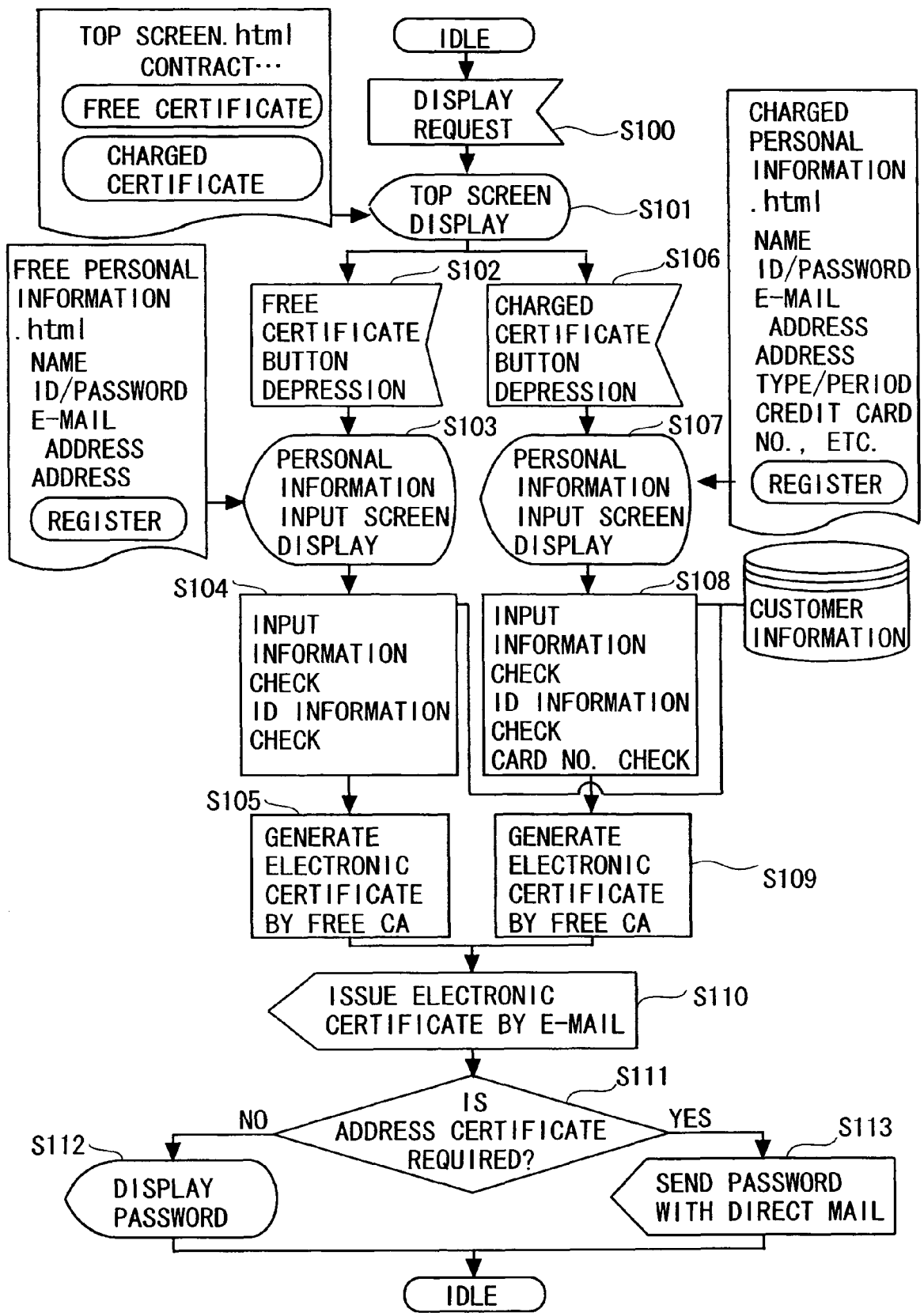

FIG. 8

RADIUS AUTHENTICATION REQUEST PACKET INFORMATION
(REFER TO RFC2865 IN DETAILS)

Radius
Code:Access Reuest(1)
Packet:identifier:xx
Length:xx
Attribute value pairs
  User name(1):value:UserB
  NAS IP Address(4):value:xxx.xxx.xxx.xxxIP ADDRESS OF NAS DEVICE(IP ADDRESS OF NAS DEVICE)
  NAS identifier(32):value:xxxxxxxxxxxxxxxxx(NAS NAME)
  NAS Port(5):value:xx(USE PORT)
  Framed MTU(12):value:1400
  NAS Port Type(61):value:wireless IEEE 802.11(19)
  EAP-Message
    Code:Response(2)
    Type:Identity
    Value:UserB
  Message Authenticator(80)

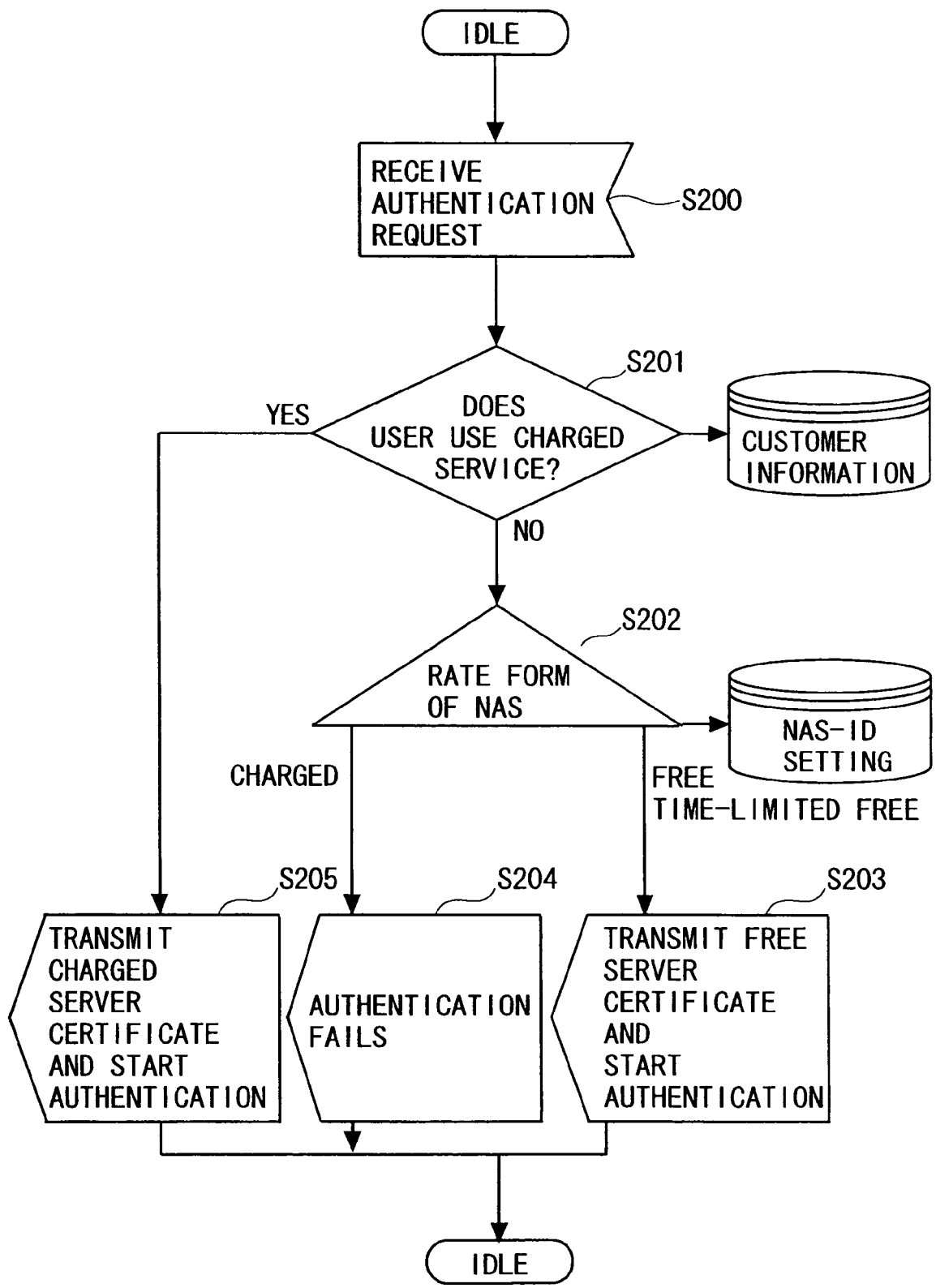

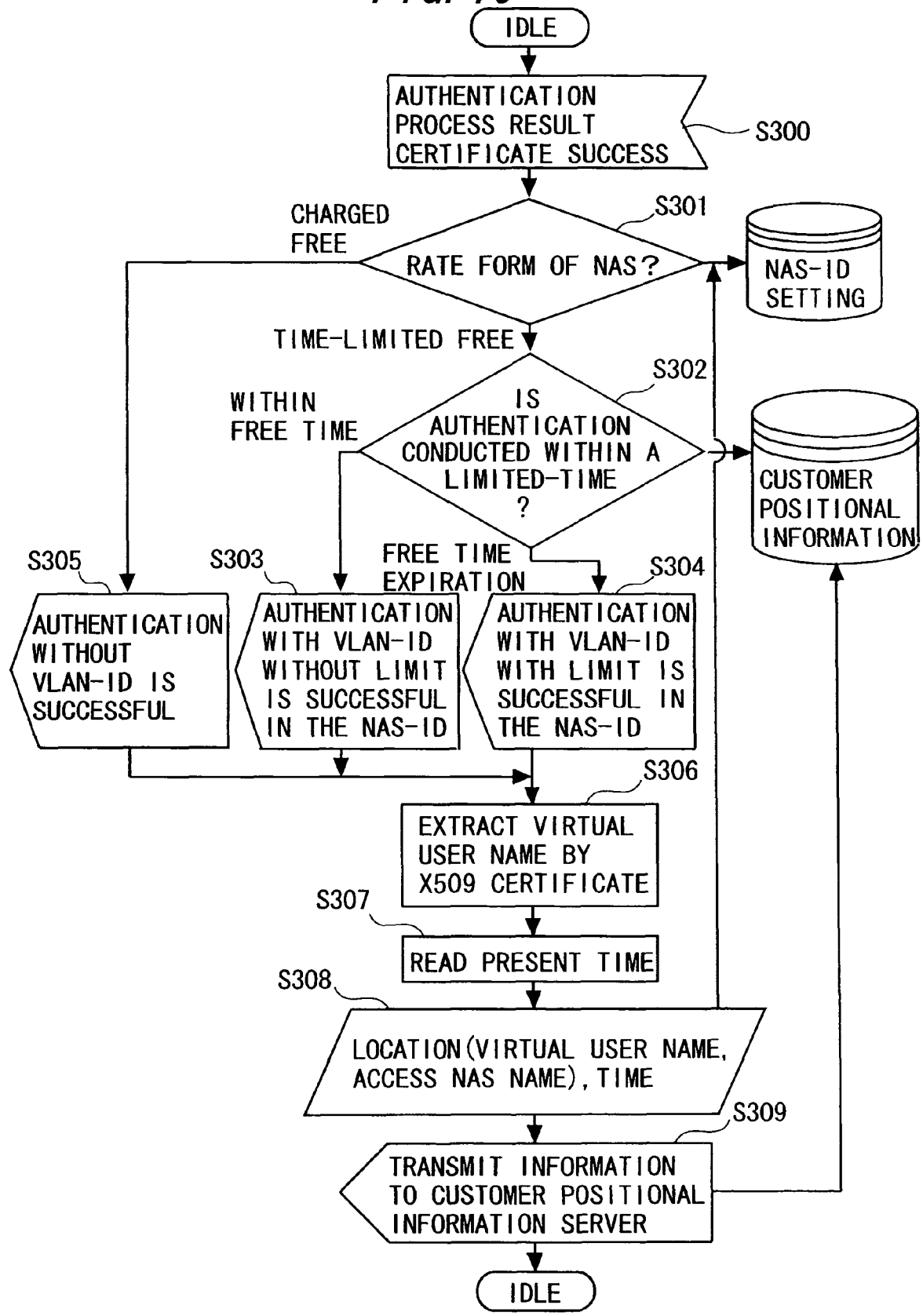

FIG. 11

| VLAN-ID | CONNECTION LIMIT |
|---------|------------------|
| X | NO LIMIT |
| Y | CONNECTABLE ONLY TO CA SERVER |

FIG. 14

| VIRTUAL NAME | SUBSCRIBER NAME |
|---|---|
| AAAA | SUBSCRIBER A |
| BBBB | SUBSCRIBER B |
| CCCC | SUBSCRIBER C |
| DDDD | SUBSCRIBER D |

FIG. 17

| NAS-ID | NAS GROUP | SHARED KEY |
|---|---|---|
| NAS-A | NASG-A | Aaaaaaa |
| NAS-B | NASG-B | Bbbbbbb |
| NAS-C | NASG-C | Ccccccc |

FIG. 18

| VALID/INVALID | SHARED KEY | NAS GROUP |
|---|---|---|
| INVALID | Default | NASG-A |

FIG. 19

| NAS GROUP | USER GROUP ID |
|---|---|
| NASG-A | UG-A |
| NASG-B | UG-B1, UG-B2 |
| NASG-B | UG-B1, UG-B2 |

FIG. 20

| USER ID | USER GROUP ID | X509 CERTIFICATE |
|---------|---------------|------------------|
| UserA   | UG-A          | Sa               |
| UserB   | UG-B1         | Sb               |
| UserC   | UG-B2         | Sb               |

FIG. 21

| NAS-ID | VLAN-ID | USER GROUP |
|--------|---------|------------|
| NAS-B  | X       | UG-B2      |
| NAS-B  | Y       | UG-B1      |
| NAS-C  | X       | UG-B2      |
| NAS-C  | Z       | UG-B1      |

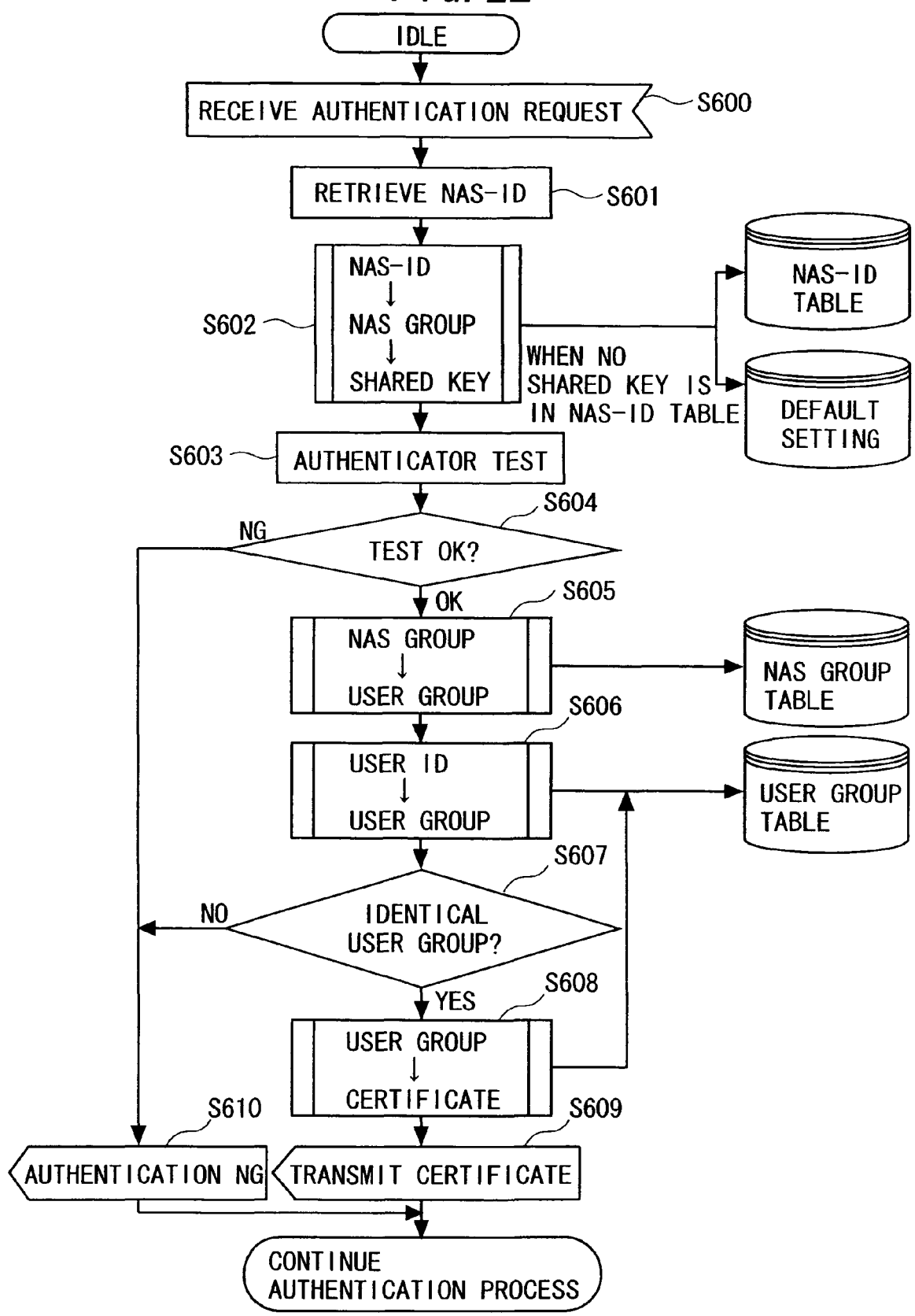

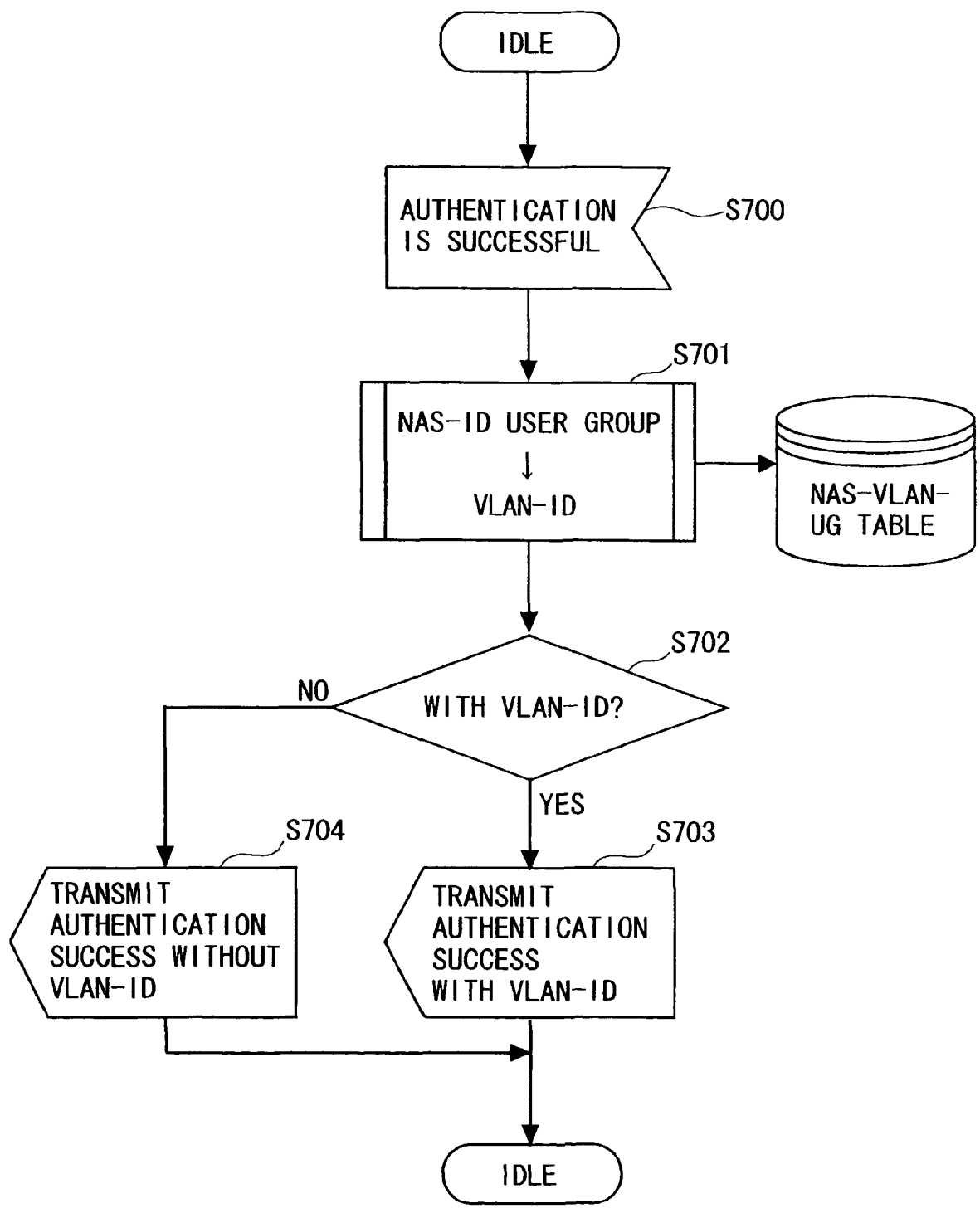

USER POSITION UTILIZATION SYSTEM

CROSS-REFERENCE TO RELATED APPLICATION

This is a continuation of Application PCT/JP2003/011554, filed on Sep. 10, 2003, now pending, the contents of which are herein wholly incorporated by reference.

BACKGROUND OF THE INVENTION

1. Field of the Invention

The present invention relates to a technique of utilizing information (when, where, who) related to a position of a user terminal (its user) that enters a communication area provided by a given radio LAN access point.

2. Description of the Related Art

Up to now, in the case where a service provider provides an access point of a public radio LAN, it is necessary to locate a radio LAN access point (hereinafter referred to also as "AP") at respective locations.

The location of AP requires considerable expense, and for that reason, most of the access point services are charged services such as a monthly rate system.

However, when the service starts for free but thereafter moves from free to fee based, there is a tendency to reduce the number of subscribers after moving to fee based, and therefore the service provider wants to provide the service with no fee.

Under the above circumstances, there has been proposed apparatus for showing a subscriber an advertisement, obtaining earnings as an advertising fee, and making an access point service free (for example, refer to Patent Document 1).

The following are related arts to the present invention.
Patent Document 1
JP 2002-124993 A
Patent Document 2
JP 2001-111544 A
Patent Document 3
JP 2001-268125 A
Patent Document 4
JP 2003-67630 A
Non-Patent Document
RFC2865

However, because the conventional art presumes the advertisement with respect to the subscriber who presently exists on the access point, it is difficult to distribute the advertisement that is temporally free. This is because the advertisement delivery to a customer who is in the store presently can be performed by delivering the advertisement to a terminal accessing a network, but there arises a problem in that the above method cannot be performed in the case where the advertisement is to be delivered to the customer who has come to the store in the past but is not in the store presently.

SUMMARY OF THE INVENTION

An object of the present invention is to make it possible to distribute an advertisement to customers who satisfy a given condition including a customer who has utilized a radio LAN access point in the past but does not utilize the radio LAN access point presently.

The present invention has been made to solve the above object, and provides a user position utilization system that allows utilization of information related to a position of a user via an IP Internet, including: memory unit storing information for specifying date at which a user terminal can communicate within a communication area provided by a given radio LAN access point, information for specifying the access point, and information for specifying the user; and utilization utilizing the information stored in the memory unit.

According to the present invention, the memory unit stores, for example, a date at which a user terminal enters a communication area that is provided by an access point located in a given store, the access point, and the user (terminal user) therein. Therefore, it is possible to extract the user who satisfies the given condition from the memory unit and transmit an advertisement mail to an e-mail address of the user. As a result, it is possible to distribute the advertisement to the customers who satisfy the given condition such as a customer who has utilized the access point in the past but does not utilize the access point presently. This shows a utilization example by the utilization unit. It is possible to collect the information such as date specifying information which is stored in the memory unit through various methods. For example, in the case where the information is to be authenticated by an authentication server (for example, a RADIUS server), there is considered that those information may be collected and stored on the basis of the authentication information that occurs in a process of the authentication.

For example, the user position utilization system further includes a table storing a given e-mail address and the information specifying the user in association with each other, and in the system, the utilization unit extracts the information specifying the user who satisfies a predetermined condition from the memory unit, acquires the e-mail address associated with the information specifying the user from the table, and transmits an advertisement mail to the e-mail address.

In the user position utilization system, for example, the utilization unit extracts the information that satisfies a predetermined condition from the memory unit and prints the information in a list format. This represents a utilization example of the utilization unit.

For example, the user position utilization system further includes a CA (certificate authority) server and authentication unit, and in the system, the CA server transmits the authentication information to a given e-mail address inputted from the user terminal, the user terminal receives the authentication information transmitted from the CA sever and transmits the authentication information through a given access point, and the authentication unit receives the authentication information transmitted from the user terminal, and executes the certificate on the basis of the authentication information. The CA is also referred to as authentication station.

With the above system, it is possible to collect the e-mail addresses at which the advertisement can be reliably distributed to the users.

This is because that the authentication (authentication by the authentication unit) can be conducted by using an electronic certificate that has been transmitted to the e-mail address (transmitted from the user terminal) represents that the electronic certificate has been reliably reached to the e-mail address.

Also, in the user position utilization system, for example, the authentication information is an electronic certificate, an ID, and a password. This is an example of the authentication information.

For example, the user position utilization system further includes a table storing a given e-mail address inputted from the user terminal and the information specifying the user in association with each other, and in the system, the utilization unit extracts the information specifying the user who satisfies a predetermined condition from the memory unit, acquires the e-mail address associated with the information specifying the user from the table, and transmits an advertisement mail to the e-mail address.

With the above system, it is possible to collect the e-mail addresses (e-mail addresses that can be reliably distributed to the users) which have been inputted at the time of requesting an electronic certificate issuance with respect to a CA server. This is because that the authentication (authentication by the authentication unit) can be performed by using the electronic certificate that has been transmitted to the e-mail address (transmitted from the user terminal) means that the electronic certificate is reliably reached to the e-mail address.

For example, the user position utilization system further includes printing unit, and in the system, the CA server creates the electronic certificate in an available form by using a given password, and the printing unit prints a given residence and superscription which are inputted from the user terminal with the given password as a direct mail address for notifying the user of the given password.

Also, the present invention can be specified as follows:

An authentication server (for example, RADIUS server) that is connected to a given access point and transmits an electronic certificate to a user terminal accessing through the given access point, the server including: memory unit storing the electronic certificate; read unit reading the electronic certificate associated with information for identifying the given access point from the memory unit; and transmission unit transmitting the electronic certificate read from the read unit to the accessing user terminal.

With the above system, it is possible to conduct processing on a single authentication server because the electronic certificates different depending on the access points can be transmitted. It is unnecessary to provide plural authentication servers as unlike the conventional art.

For example, the authentication server further includes judgment unit judging whether a user of the terminal accessing through the given access point belongs to a specific user group or not, and in the server, the read unit reads the certificate from the memory unit when the judgment unit judges that the user belongs to the specific user group.

With the above authentication server, it is possible to limit a transmission destination of the electronic certificate. For example, even if a user A who can obtain the electronic certificate through an access point of A company is moved to an access point of B company, the user A cannot obtain the electronic certificate associated with the access point of B company if the user A does not belong to a specific group.

For example, the authentication server further includes: memory unit storing a shared key; read unit reading a shared key associated with information for identifying the given access point from the memory unit; and execution unit executing a given process by the shared key read from the read unit.

With the above authentication server, even if the IP address and the shared key cannot be managed in association with each other since IP addresses are dynamically distributed by DHCP as in the conventional art, it is possible to appropriately manage the shared key.

In the authentication server, the execution unit executes the given process by a default shared key when the shared key is not stored in the memory unit.

With the above authentication server, it is possible to execute a given process by a default shared key even in the case where the shared key in question is not stored in the memory unit. This is effective, for example, when the access point is newly located.

Also, the present invention can be specified as follows:

A RADIUS server characterized by adding a result of converting the NAS-ID of authentication information into positional information and transmitting the result to a customer position server as a customer positional information.

A RADIUS server that uses a user ID included in a login request to search and refer to respective tables, and selects a certificate to be returned, thereby enhancing the convenience of a subscriber.

A RADIUS server that controls VLAN and realizes a time free area.

A RADIUS server that selects VLAN-ID that allows access to only a specific web such as a page prompting certificate acquisition in the case where a time determined by a free certificate is over.

A RADIUS server that selects an open VLAN-ID in the case where authentication is conducted by a charged certificate.

A customer positional information server that receives authentication information and processes customer information.

A customer positional information server that transmits adjacent advertisement information to a customer who is now in a store upon reception of an authentication information.

A customer positional information server that transmits appropriate advertisement information at an appropriate time by using past authentication information.

A CA server that processes a demand from a general customer and issues a certificate.

A CA server that transmits an issued certificate by e-mail to readily create a certificate that certifies an e-mail address.

A CA server that sends a password for decompression of the issued certificate by direct mail to readily issue a certificate that certifies an address.

A CA server that transmits an issued user ID/password by e-mail to readily create a certificate that certifies an e-mail address.

A CA server that sends an issued user ID/password by direct mail to readily issue a certificate that certifies an address.

A CA server that issues a certificate under a virtual name to keep security.

A customer information management database server that leads a real name from a virtual name.

The authentication information when logging on an access point is collected by an authentication server (for example, RADIUS server), and then stored as information on a customer who comes to a store.

The information on the customer who comes to a store represents "when", "where", and "who" exists. The term "when" is, for example, an authentication time. The term "where" can be converted from NAS-ID (network access server-identifier) which is identifiers of the respective AP. The customer information is utilized for determination of an advertisement distribution destination, and the appropriate advertisement distribution can be realized on a timely basis.

BRIEF DESCRIPTION OF THE DRAWINGS

FIG. 1 is a diagram explaining a schematic configuration of a network system according to a first embodiment;

FIG. 2 is a diagram explaining a schematic configuration of a CA server;

FIG. 3 shows an example of a customer information table;

FIG. 4 shows an example of a customer positional information table;

FIG. 5 shows an example of a NAS-ID setting table;

FIG. 6 shows an example of an access point setting table;

FIG. 7 is a flowchart explaining processing until the CA server issues an electronic certificate;

FIG. 8 shows a packet example for requesting authentication from a RADIUS server;

FIG. 9 is a flowchart explaining processing of the RADIUS server;

FIG. 10 is a flowchart explaining processing of the RADIUS server;

FIG. 11 shows a setting example of a VLAN switch;

FIG. 14 shows an example of a virtual name conversion table;

FIG. 17 shows an example of a NAS-ID table;

FIG. 18 shows an example of a default setting;

FIG. 19 shows an example of a NAS group table;

FIG. 20 shows an example of a user group table;

FIG. 21 shows an example of a NAS-VLAN-UG table;

FIG. 22 is a flowchart explaining processing of a RADIUS server;

FIG. 23 is a flowchart explaining processing of the RADIUS server.

DETAILED DESCRIPTION OF THE PREFERRED EMBODIMENT

Figure 12:
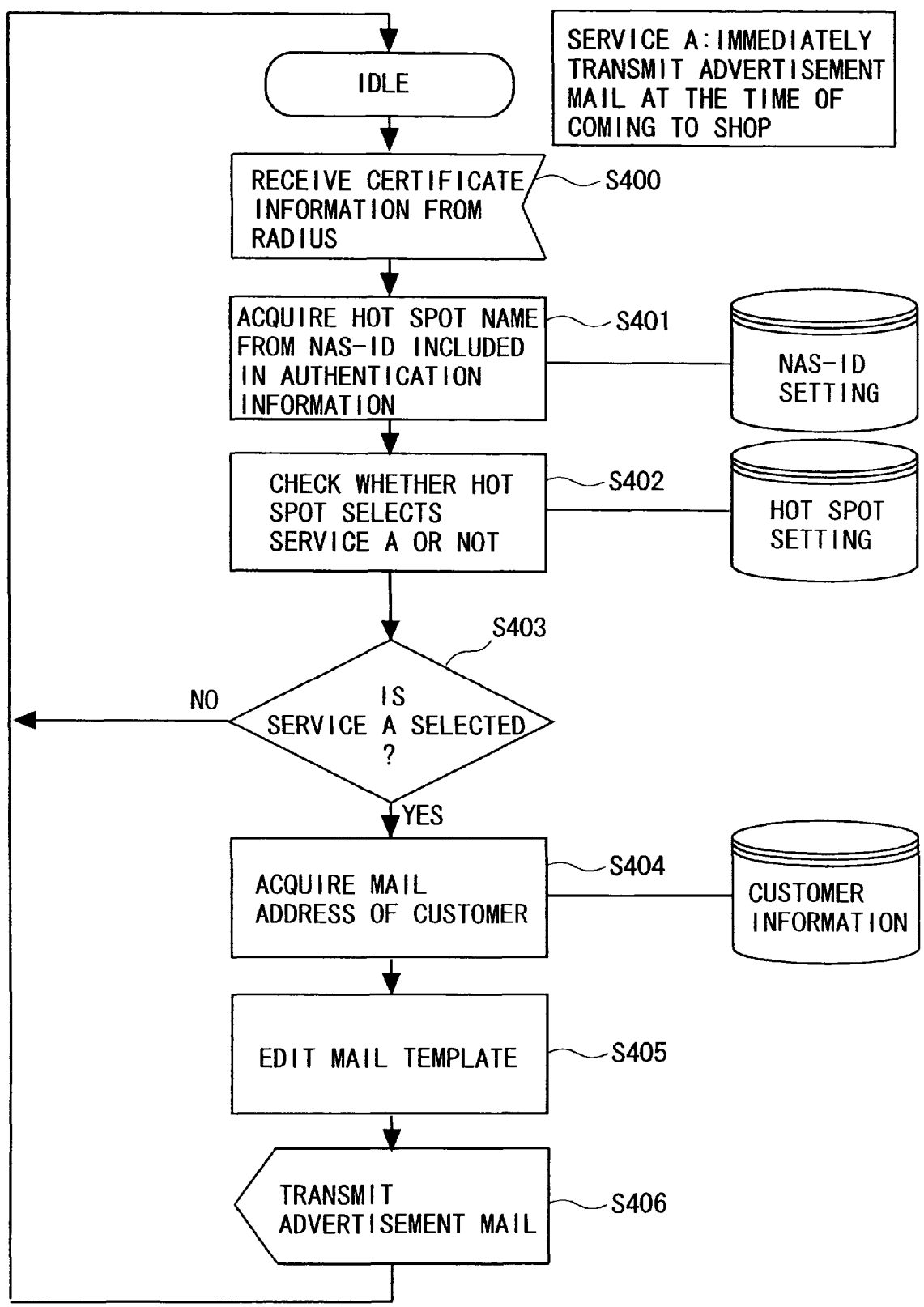
FIG. 12 is a flowchart explaining processing (advertisement mail distribution example 1) of a customer positional information server.

Hereinafter, a description will be given of a network system according to a first embodiment of the present invention with reference to the accompanying drawings.

As shown in FIG. 1, the network system includes a RADIUS server, a customer positional information server, a CA server, a RDBMS, and an access point (hereinafter referred to also as "AP"). The access point is also generally called "hot spot" (registered trademark).

An RADIUS server 100 checks an authentication request from the access point, and judges whether authentication is permitted or not according to authentication information (X509 certificate, etc.). In this situation, the RADIUS server 100 transfers authentication requesting AP information and information included in the certificate to DB as log.

A customer positional information server 200 collects customer information by a CA server 300 and the RADIUS server 100. Also, the customer positional information server 200 issues an e-mail advertisement. Detailed tables will be described later.

As shown in FIG. 2, the CA server 200 is a server that issues the X509 certificate. A subscriber accesses to the CA server 200 on the Web, and the CA server 200 authenticates the subscriber by some method (which will be described later), and issues a certificate. Unit sending the certificate to the subscriber will be described later.

A RDBMS 400 is to manage a customer information table, a customer positional information table, a NAS-ID setting table, and an access point setting table. Those tables are shown in FIGS. 3 to 6. Those tables are appropriately referred to by the RADIUS server 100, the customer positional information server 200, and the CA server 300.

As shown in FIG. 3, the customer information table is a table for registering customer information, including items of a subscriber name, an ID, a password, a service, a period of time, and an address/mail address/account, etc. As shown in FIG. 4, the customer positional information table is a table recording the customer position including items of a customer name who is in the shop, a date, a NAS-ID, and a location, etc. As shown in FIG. 5, the NAS-ID setting table is a table setting services in each of the NAS-ID (radio network area) including items of a NAS-ID, a VLAN-ID, a limit, a location, a rate form, and a time, etc. As shown in FIG. 6, the access point setting table includes a location, an advertisement service, an addition 1, an addition 2, a mail template, and manager information, etc.

A subscriber terminal (also called "user terminal") 500 is a portable information processing terminal (for example, a PDA or a note type PC), which has a function of conducting data communication with the access point AP by radio (for example, a radio LAN card). The subscriber terminal 500 conducts data communication with the access point AP by radio. That is, when the user terminal 500 is positioned in a communication area which is provided by the access point AP, data communication with the access point can be conducted. On the other hand, when the user terminal 500 is positioned out of the communication area, data communication with the access point cannot be conducted.

The access point AP is a device providing the communication area to conduct data communication by radio. The communication device using various systems can be used as the access point, and in this example, an example using the communication device (radio LAN access point) using the radio LAN will be described.

In this embodiment, an access point AP-A is located at a fast food M. branch A.

As shown in FIG. 1, the access point AP-A is structured by a public radio LAN, presently, a general public radio LAN. In the access point AP-A, authentication is conducted by not the access point AP-A, but a web screen of a known hot spot gateway (hereinafter referred to as "gateway") 600 which is connected to the access point AP-A. The gateway 600 has a RADIUS client function, which is the conventional art.

The gateway 600 removes a virtual IP address at the time of first accessing from the user terminal 500. The gateway 600 forcedly displays a screen that requests an ID and a password on a user terminal screen when there is an access from the virtual IP on the web. When the ID and the password are inputted to the user terminal 500, the gateway 600 inquires of the RADIUS server 100 for the authentication, and then issues a new address if the authentication is acceptable. Thereafter, the gateway 600 does not block an access from the new address.

(Electronic Certificate Acquiring Process)

Then, a description will be given of a process of acquiring the electronic certificate from the CA server by the RADIUS server and the user terminal.

The RADIUS server 100 acquires two server certificates from the CA server 300 through a known acquiring method. One of those server certificates is a free certificate, and the other server certificate is a charged certificate. Since the CA server 300 is put on the Internet, a general user accesses to the web that is put on the Internet, and acquires an X509 client certificate. Also, the RADIUS server 100 also acquires the user ID and the password in this situation.

Although both of the charged and free certificates can be acquired, the free certificate is generally acquired. This is because an expense incurred in connection with the certificate acquirement is covered by an advertisement fee.

A method of acquiring the electronic certificate is stated below.

(1) In the case of a subscriber who has been already managed, authentication is conducted by the user ID/password which is supplied by a telecommunication carrier, and an electronic certificate is issued. (2) In the case where an access is conducted by a new user who has not yet been managed, the issued electronic certificate is sent (transmitted) to an e-mail address of the user in order to certify the e-mail address with respect to the access point. As will be described later, the user terminal 500 receives the electronic certificate that has been sent to the e-mail address, and authenticates the e-mail address. The authentication conducted by using the electronic certificate that has been sent to the e-mail address as described above means that the electronic certificate has reached the subscriber (e-mail address). This means that the e-mail address is valid, that is, that an advertisement to the e-mail address can reliably be delivered to the subscriber (e-mail address assurance). (3) In the case where an access is conducted by the new user who has not been managed, the issued electronic certificate is sent (transmitted) to the e-mail address of the new user in order to certify the e-mail address and the residence of the user with respect to the access point, and the password that permits the electronic certificate to be available is sent by a direct mail (a hard mail or a door-to-door delivery). The user terminal 500 receives the electronic certificate that has been sent to the e-mail address, and permits the received electronic certificate to be available (for example, decompressed) by the password that is reached by a separate direct mail, to thereby conduct the authentication. The authentication conducted by using the electronic certificate that has been sent to the e-mail address as described above means that the direct mail has reached the subscriber (residence/name). This means that the residence and name are valid, that is, that an advertisement to the residence and name can reliably be delivered to the subscriber.

Subsequently, a description will be given of a process of acquiring the electronic certificate from the CA server by the user terminal with reference to the drawings. FIG. 7 is a diagram for explaining that process.

(Electronic Certificate Acquiring Process)

In this embodiment, an example of acquiring the electronic certificate from the CA server 300 will be described. First, the user terminal 500 starts a WWW browser, and conducts a display request on the CA server 300. Upon receiving the display request from the user terminal 500 (S100), the CA server 300 displays a top screen on a user terminal screen (S101). The top screen has a certificate select screen including buttons of "free certificate" and "charged certificate". Any button is selected according to the user's intension.

(Free Certificate Issuing Process)

A process of issuing the free certificate will be first described. When the button "free certificate" is selected (for example, clicked) on the certificate select screen (S102), the CA server 300 displays a personal information input screen on the user terminal screen (S103). The input screen includes input entry fields of a name, an ID/password, an e-mail address, and a residence, and a button "register".

When those items are inputted, and the button "register" is selected, the CA server 300 checks the input information and ID duplication with reference to a customer information table (S104). The input information is stored in the customer information table (refer to FIG. 3). That is, the name, the ID/password, the e-mail address, and the residence which are the input information are stored in a subscriber name, an ID/password, and a residence/e-mail address/account of the customer information table, respectively. In this example, since the free certificate button is selected (S102), the "free" is stored in a service field. Also, a system set value (for example, "null value") is stored in a period field.

In the case where the check condition is satisfied in S104, the CA server 300 generates the electronic certificate by the free CA (S105). The electronic certificate is, for example, encrypted, and is not available if the user does not know a password (which will be described later) which permits the electronic certificate to be available by decompression.

(Charged certificate Issuing Process)

Subsequently, a description will be given of a process of issuing the charged certificate. When the button "charged certificate" is selected (for example, clicked) on the certificate select screen (S106), the CA server 300 displays the personal information input screen on the user terminal screen (S107). The input screen includes input fields such as a name, an ID/password, an e-mail address, a residence, a type/period, and a credit card No. and a button "register".

When those items are inputted, and the button "register" is selected, the CA server 300 checks the input information and also checks the ID duplication and the card No., with reference to the customer information table (S108). The input information is stored in the customer information table (refer to FIG. 3). That is, the name, the ID/password, the type/period, the e-mail address, the residence, and the credit card No. are stored in the subscriber name, the ID/password, the period, and the residence/e-mail address/account of the customer information table, respectively (refer to FIG. 3). In this example, since the charged certificate button is selected (S106), the "charged" is stored in the service field.

In the case where the check condition is satisfied in S108, the CA server 300 generates the electronic certificate by the charged CA (S109). The electronic certificate is, for example, encrypted, and is not available if the user does not know a password (which will be described later) which permits the electronic certificate to be available by decompression.

As described above, the free certificate or the charged certificate is generated (S105, S109). The generated electronic certificate thus is transmitted to the e-mail address that has been inputted from the personal information input screen (S110).

Subsequently, the CA server 300 judges whether the certification of the residence is necessary or not (S111), and if the certification of the residence is not necessary (NO in S111), the CA server 300 displays the password that permits the electronic certificate that has been transmitted to the e-mail address in S110 to be available (for example, decompressed) on the user terminal screen (S112). On the other hand, if the certification of the residence is necessary (YES in S111), the CA server 300 prints the password and sends the printed password by a direct mail (hard mail or door-to-door delivery).

As described above, the electronic certificate can be acquired from the CA server.

(Processing in Access Point AP-A)

Subsequently, a description will be given of a process of collecting information (when, where, who) related to the location of the user terminal and storing the information in the access point AP-A. In this example, as a result of conducting the above electronic certificate acquiring process, data shown in FIG. 3 is stored in the customer information table.

First, it is assumed that a subscriber A enters the fast food M. branch A (a communication area provided by the access point AP-A thereof) (comes to the store), and turns on a power supply of the subscriber A terminal 500 that is equipped with a radio LAN card. The subscriber A terminal 500 (also called "user terminal") 500 is set with the same SSID/WEP key as the access point AP-A, and connectable to the access point AP-A without authentication. The subscriber A terminal 500 is connected on the network between the access point AP-A and the gateway 600. The gateway 600 issues a temporal address by a DHCP (dynamic host configuration protocol). The subscriber A terminal 500 that has received the issuance of the address conducts a communication by using the temporal address. The subscriber A terminal 500 starts the web browser and is going to browse some page, a request is poached by the gateway 600. When the request includes the temporal address, the gateway 600 displays a specific page (ID and password input page) on the subscriber A terminal 500.

When the ID and the password are inputted by the subscriber A terminal 500 and those input information is transmitted by the transmission button, the gateway 600 transmits the ID, the password, and the set NAS-ID to the RADIOS server 100, for example, by a packet shown in FIG. 8 (authentication request). In this example, a system that conceals the password (CHAP) is employed. The RADIUS sever 100 collates the ID and the password on the customer information table, and verifies the rate form and the limit on the NAS-ID set table, to return the authentication result.

In the case where the authentication is successful, the RADIUS server 100 transmits the authenticated subscriber name and NAS-ID to the customer positional information server.

The customer positional information server 200 stores the information in the customer position information table. Specifically, the customer positional information server 200 stores the customer name who is in the shop (who), the date (when), the NAS-ID, and the location (where) in the customer positional information table. The customer positional information server 200 stores the subscriber name from the RADIUS server 100 as the customer name who is in the shop, the date (which indicates the certificate date) from a system inner timer as the date, the NAS-ID from the RADIUS server 100 as the NAS-ID, and the location corresponding to the NAS-ID (which is obtained by collating the NAS-ID setting table and the NAS-ID) as the location therein, respectively. With the customer positional information table, it is possible to grasp when, where and who visits according to the customer positional information table. In the case where the gateway 600 receives the authentication success, the customer positional information server 200 allocates a new global address to the subscriber A terminal 500, to thereby cancel the access limit of the subscriber A terminal 500.

As described above, it is possible to collect the information (when, where, who) related to the location of the user terminal 500 and store the information in the access point AP-A. A method of using the stored information will be described later.

(Process in Access Point AP-B)

Subsequently, a description will be given of a process of collecting information (when, where, who) related to the location of the user terminal and storing the information in an access point AP-B with reference to the accompanying drawings. In this example, as a result of conducting the above electronic certificate acquiring process, data shown in FIG. 3 is stored in the customer information table. In this example, authentication is conducted in the access point AP-B. There is a case in which specific software is required for a subscriber B terminal 500. A subscriber B previously accesses to the CA server 300 in a service provider, acquires the free certificate, and holds the free certificate. The access point AP-B conducts an authentication inquiry to the RADIUS server 100 with respect to the access from the subscriber B terminal, and opens a port when the authentication is acceptable. The description is given in an EAP-TLS authentication protocol using the electronic certificate, but a protocol (for example, a PEAP protocol) by the ID and the password may be applied.

First, it is assumed that a subscriber B enters a coffee shop S. branch B (a communication area provided by the access point AP-A thereof) (comes to the store), and turns on a power supply of the subscriber B terminal 500 that is equipped with a radio LAN card.

Upon sensing the connection from the subscriber B terminal 500, the access point AP-B requests the authentication (an EAP-TLS in this example, but an authentication protocol by the ID and password may be applied). In response to the request, the subscriber B terminal 500 transmits a login ID. Upon receiving the login ID, the access point AP-B transmits the login ID and the set NAS-ID to the RADIUS server 100, for example, by a packet shown in FIG. 8 (authentication request).

Upon receiving the authentication request from the access point AP-B, the RADIUS sever 100 determines the authentication protocol, communicates with the subscriber B terminal through the access point AP-B, and conducts the authentication mutually. In this example, the authentication is conducted by the electronic certificate (X.509 format). Hereinafter, the details will be described with reference to FIG. 9.

Upon receiving the authentication request from the access point AP-B (S200), the RADIUS server 100 judges whether the user is a charged service or not (S201). For that judgment, the RADIUS server 100 collates the user ID (included in the authentication request) and the customer information table (refer to FIG. 3). A correspondence of the IDs with the services is stored in the customer information table. Accordingly, the collation makes it possible to judge whether the user is the charged service or not. In this example, since the service corresponding to the login ID of the subscriber B is "free", the judgment result in S201 is No. In the case where the judgment result is No, the RADIUS server 100 judges the rate form of the NAS (S202). For that judgment, the RADIUS server 100 collates the NAS-ID (included in the authentication request) and the NAS-ID set table. A correspondence of the NAS-IDs with the rate form is stored in the NAS-ID set table (refer to FIG. 5). Accordingly, the collation makes it possible to judge the rate form of the NAS (that is, the access point AP-B). In this example, since the rate form corresponding to the NAS-ID (HS-B) of the access point HS-B is "free" (free in S202), the RADIUS server 100 selects the free server certificate, transmits the free server certificate to the subscriber B terminal through the access point AP-B, and starts the authentication (S203). When the rate form corresponding to the NAS-ID of the access point HS-B is "charged" (charged in S202), the authentication fails (S204).

When the service corresponding to the login ID of the subscriber is "charged" (Yes in S201), the RADIUS server 100 selects the charged server certificate, transmits the charged server certificate to the subscriber B terminal 500 through the access point AP-B, and starts the authentication (S205).

On the other hand, even if there are plural certificates, the subscriber B terminal 500 selects an appropriate certificate. In this example, the subscriber B terminal 500 selects the free certificate B, and returns the free certificate B to the RADIUS server 100.

In the case where the authentication is successful, the RADIUS server 100 transmits the authenticated subscriber name and NAS-ID to the customer positional information server 200.

The customer positional information server 200 stores the information in the customer position information table. Specifically, the customer positional information server 200 stores the customer name who is in the shop (who), the date (when), the NAS-ID, and the location (where) in the customer positional information table. The customer positional information server 200 stores the subscriber name from the RADIUS server 100 as the customer name who is in the shop, the date (which indicates the authentication date) from a system inner timer as the date, the NAS-ID from the RADIUS server 100 as the NAS-ID, and the location corresponding to the NAS-ID (which is obtained by collating the NAS-ID setting table and the NAS-ID) as the location therein, respectively. With the above customer positional information table, it is possible to grasp when, where and who visits according to the customer positional information table. A method of using the stored information will be described later. The access point AP-B opens the network connection to the subscriber B terminal.

(Process in Access Point AP-C)

Subsequently, a description will be given of a process of collecting information (when, where, who, and the like) related to the location of the user terminal and storing the information in an access point AP-C with reference to the accompanying drawings. In this example, as a result of conducting the above electronic certificate acquiring process, data shown in FIG. 3 is stored in the customer information table.

The access point AP-C is an access point that can change a connected VLAN according to a reply from the RADIUS 100, and can acquire a certificate. Also, it is possible to conduct a fine control such as time-limited free by a free certificate or charged certificate.

In FIG. 1, a subscriber C with only the free certificate initially has VLAN-ID=X allocated only for 15 minutes, and can conduct an unlimited access. Thereafter, the subscriber C has VLAN-ID=Y allocated with the certificate, and can browse nothing other than a specific web site such as a certificate issuance site. On the contrary, a subscriber D who possesses the charged certificate has VLAN-ID allocated at any time, and can conduct the unlimited access. It is possible to sell the certificate with a time limit (only for a day, only for a week), or sell an ID/password by a scratch card in the access point. Also, because the sales total can be grasped at the service provider side according to the customer positional information, it is possible to enter a part of total sales to the service provider. Also, the subscriber C accesses the CA server 300 even with the free certificate, thereby making it possible to acquire the charged certificate. The VLAN switch 700 in the access point C is set with a connection limit shown in FIG. 11.

(Process by Free Certificate)

First, it is assumed that a subscriber C enters an Internet cafe I. branch C. (a communication area provided by an access point AP-C thereof) (visits the shop), and turns on a power supply of the subscriber C terminal that is equipped with a radio LAN card.

Upon sensing the connection from the subscriber C terminal 500, the access point AP-C requests the certificate (an EAP-TLS in this example, but an authentication protocol by the ID and password may be applied). In response to the request, the subscriber C terminal 500 transmits a login ID. Upon receiving the login ID, the access point AP-C transmits the login ID and the set NAS-ID to the RADIUS server 100, for example, by a packet shown in FIG. 8 (authentication request).

Upon receiving the authentication request from the access point AP-C, the RADIUS sever 100 determines the authentication protocol, communicates with the subscriber C terminal 500 through the access point AP-C, and conducts the certificate mutually. In this example, the authentication is conducted by the electronic certificate (X.509 format). Hereinafter, the details will be described with reference to FIGS. 9 and 10.

Upon receiving the authentication request from the access point AP-C (S200), the RADIUS server 100 judges whether, the user uses a charged service or not (S201). For that judgment, the RADIUS server 100 collates the user ID (included in the authentication request) and the customer information table (refer to FIG. 3). A correspondence of the IDs with the services is stored in the customer information table. Accordingly, the collation makes it possible to judge whether the user uses the charged service or not. In this example, since the service corresponding to the login ID of the subscriber C is "free", the judgment result in S201 is No.

In the case where the judgment result is No, the RADIUS server 100 judges the rate form of the NAS (S202). For that judgment, the RADIUS server 100 collates the NAS-ID (included in the authentication request) and the NAS-ID set table. A correspondence of the NAS-IDs with the rate form is stored in the NAS-ID set table (refer to FIG. 5). Accordingly, the collation makes it possible to judge the rate form of the NAS (that is, the access point AP-C). In this example, since the rate form corresponding to the NAS-ID (HS-C) of the access point HS-C is "time-limited free" (time-limited free in S202), the RADIUS server 100 selects the free server certificate, transmits the free server certificate to the subscriber C terminal through the access point AP-C, and starts the certificate (S203). When the rate form corresponding to the NAS-ID of the access point HS-C is "charged", the certificate fails (S204).

When the service corresponding to the login ID of the subscriber is "charged" (Yes in S201), the RADIUS server 100 selects the charged certificate, transmits the charged certificate to the subscriber C terminal 500 through the access point AP-C, and starts the certificate (S205).

On the other hand, even if there are plural certificates, the subscriber C terminal selects an appropriate certificate. In this example, the subscriber C terminal selects the free certificate C, and returns the free certificate C to the RADIUS server 100.

In this example, the rate form corresponding to the NAS-ID of the access point HS-C is time-limited free (time-limited free in S202). For that reason, as shown in FIG. 10, in the case where the authentication is successful (S300), the RADIUS server 100 investigates whether login is made within a given time or not. For the investigation, the RADIUS server 100 first collates the NAS-ID set table and the NAS-ID (included in the authentication request), to thereby judge whether the rate form of the NAS is time-limited free or not (S301). A correspondence of the NAS-IDs with the rate form is stored in the NAS-ID set table (refer to FIG. 5). Accordingly, the collation makes it possible to judge the rate form of the NAS. In this example, since the rate form corresponding to the NAS-ID of the access point HS-C is "time-limited free", the judgment result in S301 becomes "time-limited free" (time-limited free in S301). In this case, the RADIUS server 100 judges whether the authentication is made within a given time or not (S302). For the judgment, the RADIUS server 100 collates the customer positional information table (FIG. 4), the customer name who is in the shop, and the NAS-ID. A correspondence of the customer name who visits the shop, the NAS-IDs, and the date is stored in the customer positional information table. Accordingly, with the collation, the date corresponding to the customer name who is in the shop and the NAS-ID are obtained. The date exhibits a date at which a certain customer (customer name who is in the shop) exists in a certain access point (NAS-ID). Therefore, a period of time from the time of the day to the present time is compared with a period of time of "15 minutes" in the NAS-ID set table, thereby making it possible to judge whether authentication is conducted within a given time or not.

As a result, when the authentication is made within the free time (within the free time in S302), the certificate with unlimited VLAN-ID is successful by the NAS-ID (S303). On the other hand, when the authentication is made over the free time (free time expiration in S302), the certificate having the VLAN-ID with the NAS-ID limit is successful (S304). As described above, when the subscriber exceeds the time limit, the VLAN (VLAN-ID=Y) with a limit is returned to the access point AP-C. In this case, the access point AP-C opens the connection to the VLAN which is instructed from the RADIUS server 100 to the subscriber C terminal. On the other hand, in the case of the limited VLAN, the subscriber is connected to a gateway 800 and can access only to a specific page.

On the other hand, if the rate form in S301 is not time-limited free (charged or free in S301), the certificate with no VLAN-ID is successful (S305).

Subsequently, the RADIUS server 100 extracts a virtual user name from the electronic certificate from the subscriber C terminal 500 (S306). Also, the RADIUS server 100 reads the present time from a timer of the system or the like (S307). Then, the RADIUS server 100 stores a location into which the virtual user name and the access NAS name are converted, and the time in the NAS-ID set table. Also, the RADIUS server 100 transmits the extracted virtual user name (subscriber C), the time (X month, Y day, Z time), the NAS-ID (HS-C), the corresponding location (Internet cafe I. branch C), and the like to the customer positional information server 200 (S309).

The customer positional information server 200 stores the virtual user name (who), the time (when), the NAS-ID, and the location (where) in the customer positional information table. The customer positional information table makes it possible to grasp when, where, and who visits. A method of using the stored information will be described later.

The access point AP-C opens the connection to the VLAN which is instructed from the RADIUS server 100 to the subscriber C terminal. Also, in the case of the limited VLAN, the subscriber is connected to the gateway 800 and can access only to a specific page.

(Process by Charged Certificate)

Subsequently, it is assumed that a subscriber D enters an Internet cafe I. branch C. (a communication area provided by an access point AP-C thereof) (visits the shop), and turns on a power supply of the subscriber D terminal that is equipped with a radio LAN card.

Upon sensing the connection from the subscriber D terminal 500, the access point AP-C requests the certificate (an EAP-TLS in this example, but an authentication protocol by the ID and password may be applied). In response to the request, the subscriber D terminal 500 transmits a login ID. Upon receiving the login ID, the access point AP-C transmits the login ID and the set NAS-ID to the RADIUS server 100, for example, by a packet shown in FIG. 8 (authentication request).

Upon receiving the authentication request from the access point AP-C, the RADIUS sever 100 determines the authentication protocol, communicates with the subscriber C terminal through the access point AP-C, and conducts the certificate mutually. In this example, the authentication is conducted by the electronic certificate (X.509 format). Hereinafter, the details will be described with reference to FIGS. 9 and 10.

Upon receiving the authentication request from the access point AP-C (S200), the RADIUS server 100 judges whether the user is a charged service or not (S201). For that judgment, the RADIUS server 100 collates the user ID (included in the authentication request) and the customer information table (refer to FIG. 3). A correspondence of the IDs with the services is stored in the customer information table. Accordingly, the collation makes it possible to judge whether the user uses the charged service or not. In this example, since the service corresponding to the login ID of the subscriber D is "charged", the judgment result in S201 is Yes. In this case, the RADIUS server 100 selects the charged server certificate D, transmits the charged server certificate D to the subscriber D terminal 500 through the access point AP-C, and starts the certificate (S205).

As shown in FIG. 10, in the case where the authentication is successful (S300), the RADIUS server 100 collates the NAS-ID set table and the NAS-ID (included in the authentication request), to thereby judge whether the rate form of the NAS is time-limited free or not (S301). A correspondence of the NAS-IDs with the rate form is stored in the NAS-ID set table (refer to FIG. 5). Accordingly, the collation makes it possible to judge the rate form of the NAS. In this example, since the rate form corresponding to the NAS-ID of the access point HS-C is "charged", the judgment result in S301 becomes "charged" (charged in S301). In this case, the certificate with no VANID is successful (S305).

As described above, because the subscriber D is accessed by the charged certificate, the RADIUS server 100 returns the VLAN without a limit (VLAN-ID=X in this example) to the access point AP-C.

Subsequently, the RADIUS server 100 extracts a virtual user name from the electronic certificate which is from the subscriber C terminal 500 (S306). Also, the RADIUS server 100 reads the present time from a timer of the system or the like (S307). Then, the RADIUS server 100 stores a location into which the virtual user name and the access NAS name are converted, and the time in the NAS-ID set table. Also, the RADIUS server 100 transmits the extracted virtual user name (subscriber C), the time (X month, Y day, Z time), the NAS-ID (HS-C), the corresponding location (Internet cafe I. branch C.), and the like to the customer positional information server 200 (S309).

The customer positional information server 200 stores the virtual user name (who), the time (when), the NAS-ID, and the location (where) in the customer positional information table. The customer positional information table makes it possible to grasp when, where, and who visits. A method of using the stored information will be described later.

The access point AP-C opens the connection to the VLAN which is instructed from the RADIUS server 100 to the subscriber C terminal. Also, in the case of the limited VLAN, the subscriber is connected to the gateway 800 and can access only to a specific page.

Applied Example 1 of Customer Positional Information Table

Subsequently, a description will be given of an applied example 1 of the information (when, where, who) stored in the customer positional information table as described above with reference to the drawings.

As shown in FIG. 12, it is assumed that the customer positional information server 200 receives the authentication information from the RADIUS server 100 (S400). The customer positional information server 200 obtains the access point name from the NAS-ID in the authentication information (S401). For that reason, the customer positional information server 200 collates the NAS-ID set table and the NAS-ID in the authentication information. A correspondence of the NAS-ID with the access point (location) is stored in the NAS-ID set table. Accordingly, the collation makes it possible to obtain the access point name (location) corresponding to the NAS-ID in the authentication information.

Subsequently, the customer positional information server 200 checks whether the access point selects the service A or not (S402). For the check, the customer positional information server 200 collates the access point name (location) which has been obtained earlier and the access point set table. A correspondence of the access point name (location) and the advertisement service is stored in the access point set table. Accordingly, the collation makes it possible to obtain the service that is selected by the access point. As a result of the check, when the access point selects the service A (Yes in S403), the customer positional information server 200 obtains the e-mail address of the customer (S404). Specifically, the customer positional information server 200 collates the customer information table and the ID in the authentication information. A correspondence of the ID with the e-mail address is stored in the customer information table. Accordingly, the collation makes it possible to obtain the e-mail address corresponding to the ID in the authentication information.

Upon obtaining the e-mail address, the customer positional information server 200 edits (for example, sets the address as a subscriber name) a mail template (an advertisement file designated by a mail template in an access point set table) corresponding to the access point name (location) (S405), and then transmits the edited mail template to the e-mail address that has been obtained earlier as an advertisement mail (S406).

The above process makes it possible to immediately transmit the advertisement mail to the subscriber that has entered the access point.

Applied Example 2 of Customer Positional Information Table

Subsequently, a description will be given of an applied example 2 of the information (when, where, who) stored in the customer positional information table as described above with reference to the drawings.

Figure 13:
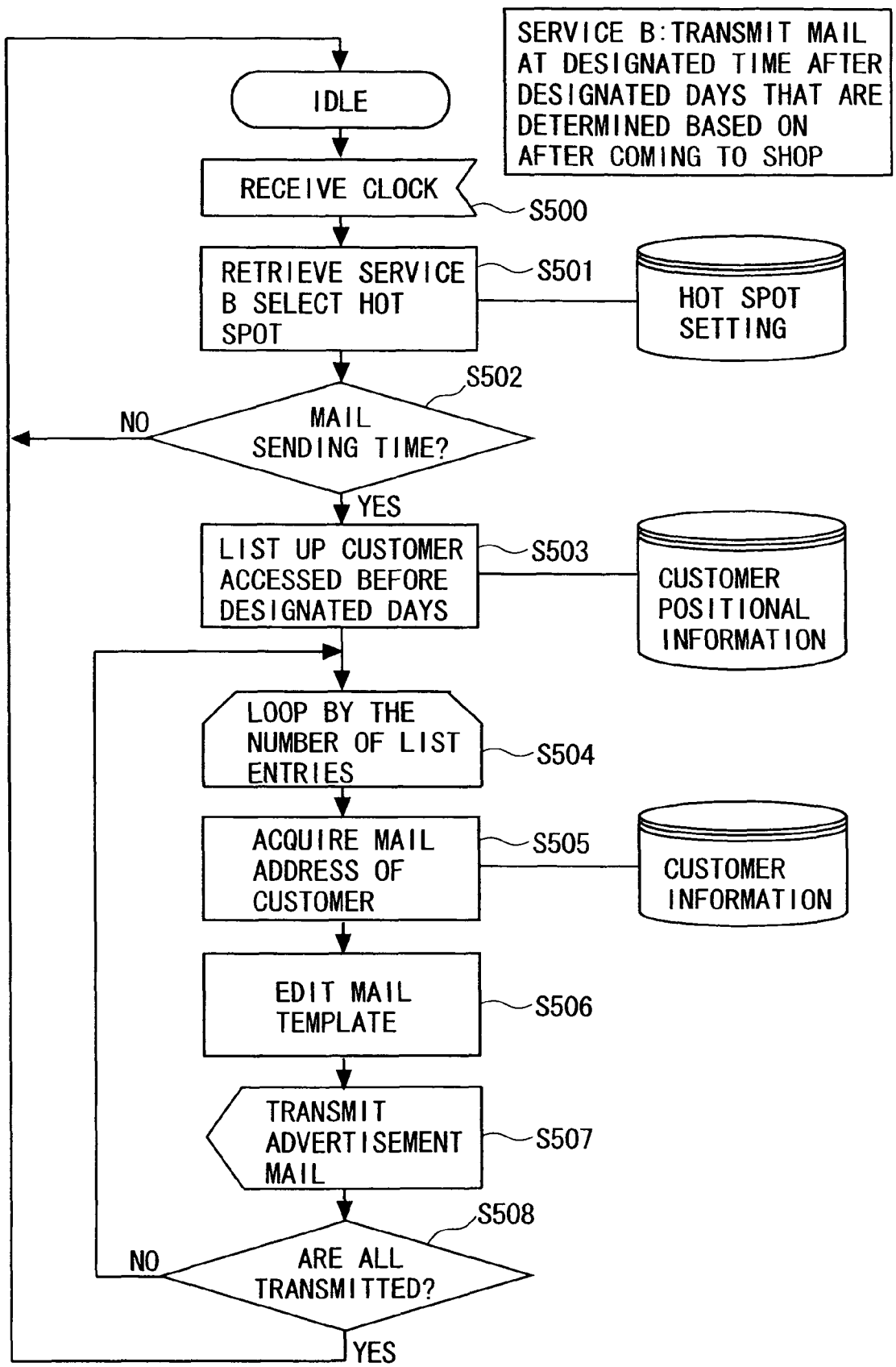
FIG. 13 is a flowchart explaining processing (advertisement mail distribution example 2) of a customer positional information server.

As shown in FIG. 13, it is assumed that the customer positional information server 200 receives a clock from a timer within the system or the like (S500). The clock occurs, for example, every set time. The customer positional information server 200 retrieves the service B select access point (S501). For the retrieval, the customer positional information server 200 refers to the access point set table. A correspondence of the access point (location) with the advertisement service (service types such as a service A or B) is stored in the access point set table. Accordingly, the reference makes it possible to retrieve the access point that selects the service B.

The customer positional information server 200 judges whether the retrieved access point is in a mail sending time or not, at every retrieved access point. For the judgment, the customer positional information server 200 refers to the access point set table. A correspondence of the access point (location) with an addition 1 (mail sending time) is stored in the access point set table. Accordingly, the reference makes it possible to obtain the mail sending time at every retrieved access point. Then, the mail sending time is compared with a time obtained form the timer within the system or the like, to thereby judge whether the retrieved access point is in the mail sending time or not (S502).

As a result, in the case where it is judged as the mail sending time (Yes in S502), the customer positional information server 200 lists up the customers who have accessed to the same access point before a designated date (an addition 2 in the access point set table) (S503). For that listing up, the customer positional information server 200 compares the customer positional information table with the addition 2 in the access point set table and the location. A correspondence of the date (when), the location (where), and a customer name who is in the shop (who) is stored in the customer positional information table. Accordingly, the comparison makes it possible to list up the customer names who are in the shop corresponding to the addition 2 in the access point set table and the location.

Subsequently, the customer positional information server 200 transmits the advertisement mail to the number of customers listed up (S504 to S509). Specifically, the customer positional information server 200 first obtains the e-mail address of the customer (S505). Specifically, the customer positional information server 200 collates the customer information table and the listed-up customer name who is in the shop (one person in this example). A correspondence of the ID with the e-mail address is stored in the customer information table. Accordingly, the collation makes it possible to obtain the e-mail address corresponding to the listed-up customer name who is in the shop.

Upon obtaining the e-mail address, the customer positional information server 200 edits (for example, set the address as the subscriber name) a mail template (an advertisement file designated by a mail template in an access point set table) corresponding to the access point that is retrieved in S501 (S506), and then transmits the edited mail template to the e-mail address that has been obtained earlier as an advertisement mail (S507).

When the advertisement mail transmission has not been completed with respect to all of listed-up customers (No in S508), the customer positional information server 200 obtains the e-mail address of the customer name who is in the shop (a next person) listed up in the same manner as the above, and transmits the e-mail to the address (S504 to S508). The process is repeated until the transmission to all of the listed-up customers has been completed. Then, upon completion of transmission of the advertisement mail with respect to all of the listed-up customers (Yes in S508), the processing is returned to the initial stage of the flow and continues.

With the above process, it is possible to transmit the advertisement mail to the users who satisfy a given extraction condition (S503, etc.) among the subscribers that entered the access point in the past.

Also, there can be proposed an applied method in which the information (subscriber names, addresses, and the like) which satisfies the predetermined condition is extracted from the customer information table that functions as the memory unit, and the information is printed in the format of a list.

Modified Example

Subsequently, a modified example will be described. When the authentication is conducted by the X.509 electronic certificate, there arises such a problem on the security that the information (name, etc.) within the certificate can be referred to from a radio monitor. In order to solve the above problem, the name within the electronic certificate is set to a virtual name in this modified example. Specifically, the CA server 300 generates the virtual names at random, and generates a virtual name conversion table that associates the subscriber names with the virtual names respectively. FIG. 14 shows an example of the virtual name conversion table. When preparing the authentication information, the CA server 300 converts the virtual name into the subscriber name by using the table.

The above process makes it possible to solve the problem on the security since the information within the certificate is the senseless virtual name even if the information within the certificate is referred to from the radio monitor.

(Authentication Process by Electronic Certificate)

(Industrial Application Field)

Subsequently, according to another aspect of the present invention, a description will be given of a RADIUS, and a Radius that manages a small-scaled radio LAN area and a large-scaled network by one RADIUS.

(Conventional Art)

Up to now, the RADIUS server of the radio LAN is required to be located on every network. When a secure radio LAN is going to be structured, it is necessary to locate the RADIUS server, which causes an expensive system. In particular, in the case where there is one access point (hereinafter referred to as "AP"), the efficiency is decreased.

(Problem with the Conventional Art)

Because the RADIUS servers are expensive, there is proposed a service that manages those RADIUS servers on the Internet together (outsource of the RADIUS server). This service suffers from the following problems.

(1) A shared key (an encryption key shared between the server and the access point) is associated with the source address of the packet. For that reason, the address of the client must be fixed and the management is complicated. Also, the general network is allocated to the DHCP. (2) Although one server is desired to manage plural groups (outsourcing parties), such a function is not provided. (3) A user or group that can conduct login every AP is desired to be set. (4) A radio LAN authentication protocol (EAP-TLS/TTLS/PEAP) using the electronic certificate can obtain only one certificate by one RADIUS. This makes it impossible to certify plural groups different in authentication station by one RADIUS.

(Unit and Operation for Solving the Problem)

The problems are solved by the following methods.

Figure 15:
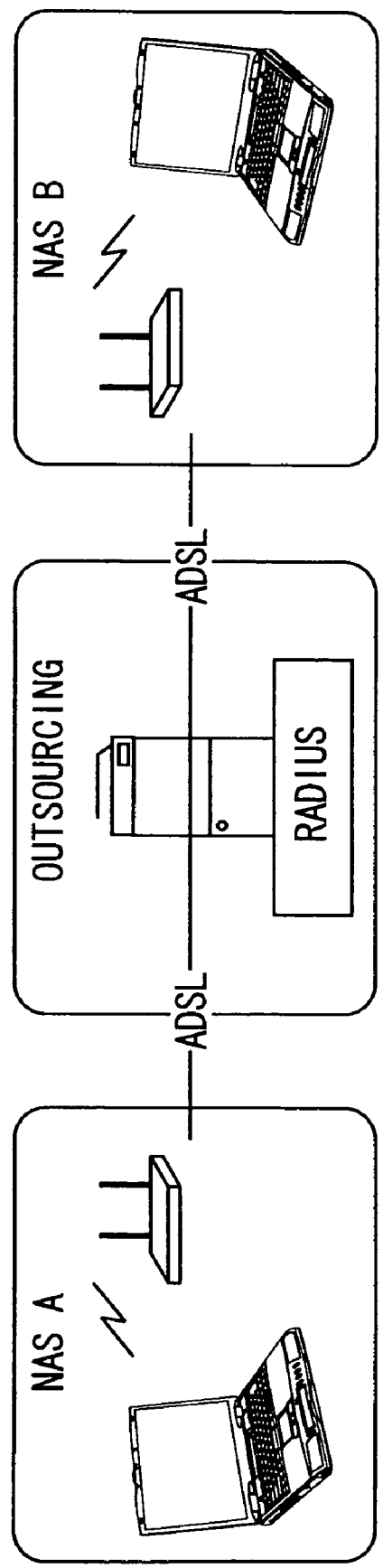
FIG. 15 is a diagram explaining a schematic configuration of a network system according to a second embodiment.

(1) In the case where there is no spoofing server inside the LAN, the shared key has no much meaning. For that reason, the shared key is managed by every NAS-ID so that the IP address of the access point may be allocated by the DHCP. In the case of the NAS-ID that is not managed, the default key is kept available. (2) A user or user group that permits the certificate for every NAS-ID is settable. Also, the NAS-ID can be grouped (NAS group). (3) The server certificate can be switched over every NAS group. With the above structure, the authentication server of the radio LAN can be outsourced (refer to FIG. 15).

Also, in the case where the security of the network is controlled by the VLAN, the VLAN-ID determining methods may not be unified within the NAS group. In order to flexibly cope with the above case, (4) the VLAN-ID can be controlled in every NAS group. As a result, the outsourcing of the authentication server can be conducted with respect to an association that controls the security by the VLAN. Also, the association can be controlled even if the VLAN-ID is different in each of the NASs.

Embodiments

Hereinafter, a network system according to this embodiment will be described with reference to the drawings.

Figure 16:
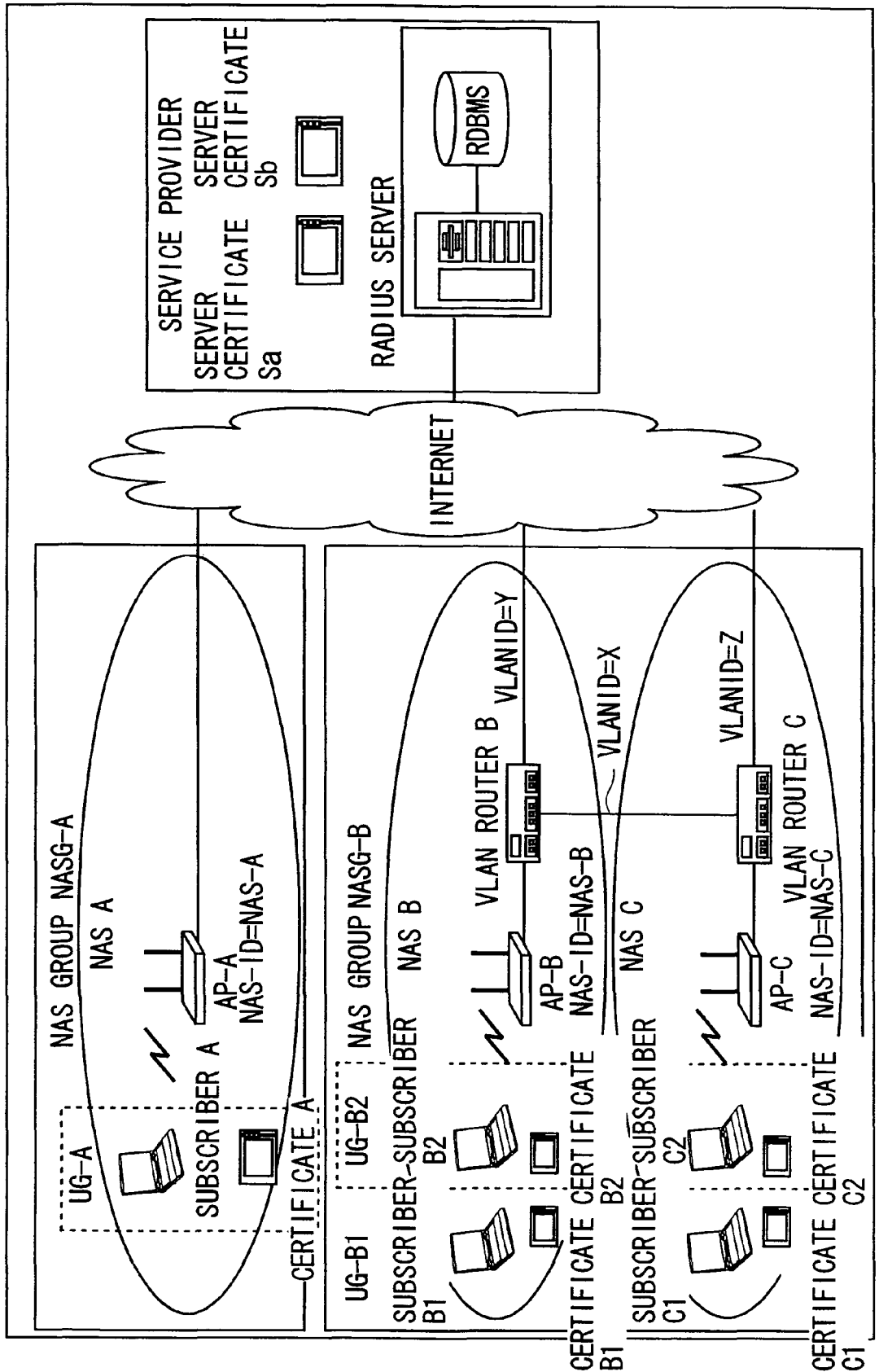
FIG. 16 is a diagram explaining a schematic configuration of a network system according to the second embodiment.

As shown in FIG. 16, this system includes a RADIUS server 100, a customer positional information server 200, a RDBMS 400, and the access point (hereinafter referred also to "AP"). The access point is generally called "hot spot" (registered trademark). Because they are substantially identical in the structure with those described in the above, identical symbols are denoted, and their description will be omitted.

The service provider outsources the RADIUS server 100. The subscriber (user terminal) 500 makes the authentication success only within the NAS group. Each of the NASs has an AP that supports the RADIUS, and in the case of FIG. 15, the AP further supports the EAP-TLS (the authentication protocol is not particularly specified). The AP of the NAS group NASG-B constitutes the VLAN within each of the NASs. The VLAN-ID that is connected to the Internet is different in both of them.

The RDBMS 400 is to manage the NAS-ID table, the default set value, the NAS group table, the user group table, and the NAS-VLAN-UG table. Those tables are appropriately referred to by the RADIUS server.

As shown in FIG. 17, the NAS-ID table includes the items of the NAS-ID, the NAS group, and shared key. As shown in FIG. 18, the default set value includes the items of the valid/invalid, the shared key, and the NAS group. As shown in FIG. 19, the NAS group table includes the items of the NAS group and the user group ID. As shown in FIG. 20, the user group table includes the items of the user ID, the user group ID, and the X509 certificate. As shown in FIG. 21, the NAS-VLAN-UG table includes the items of the NAS-ID, the VLAN-ID, and the user group.

(Authentication Process in NASG-A)

Subsequently, an authentication process in the NASG-A will be described.

Upon receiving a connection request from the subscriber A (subscriber A terminal), the access point AP-A transmits the authentication request including the self NAS-ID (NAS-A) and the subscriber ID (user ID) to the RADIUS server 100. Upon receiving the authentication request from the access point AP-A (S600), the RADIUS server 100 extracts the NAS-ID from the authentication request (S601), retrieves the shared key from the NAS-ID table (S602), and verifies the authenticator in the packet (S603). In the case where there is no NAS-A in the NAS-ID table, and also in the case where the default shared key is valid, the authentication is conducted by using the default shared key (S602). In the case where the verification is acceptable (OK in S604), the RADIUS server 100 retrieves the user group of the NAS according to the NAS group table (S605). Also, the RADIUS server 100 retrieves the group to which the user ID belongs according to the user group table (S606), and in the case where there exists the group included in both of them (that is, in the case where the user who is specified by the user ID is judged to belong to a specific user group (YES in S607), the RADIUS server 100 selects the certificate of that group (S608) and transmits the certificate (S607). Thereafter, the authentication is conducted. In the case where the check in S604 is NG, or in the case where the judgment in S607 is NO, the authentication is NG (S610).

(Authentication Process in NASG-B)

Subsequently, a description will be given of an authentication process in the NASG-B.

The NASG-B includes the NAS-B and the NAS-C, and the user group has an UG-1 and an UG-2. Also, the access is controlled by the VLAN, and there is a closed network that is connected to the Internet. In FIG. 16, the following set is made. NAS-B VLAND-ID=X=>NASG-B inner connection, NAS-B VLAND-ID=Y=>Internet connection, NAS-C VLAN-ID=X=>NASG-B inner connection, NAS-CVLAN-ID=Z=>Internet connection. Also, the user group UG-B1 is connectable on the Internet. The UG-B2 is only available within the NAS group.

Since the process is identical with the NASG-A until the authentication operation, the subsequent process will be described with reference to FIG. 23.

In the case where the authentication is successful as a result of authentication in the RADIUS server 100 (S700), the VLAN-ID is retrieved (S701). The VLAN-ID is retrieved by using the user group to which the user belongs and the NAS-ID as the key according to the NAS-VLAN-UG table. In the case where the VLAN-ID is found (YES in S702), the RADIUS server attaches the ID to the authentication success packet and transmits the authentication success packet to the access point (S703). The access point connects the subscriber to the VLAN-ID that has been received from the RADIUS server 100. On the other hand, in the case where the VLAN-ID is not found (NO in S702), the RADIUS server 100 transmits the authentication success packet to the access point without the VLAN-ID (S704).

It is needless to say that the relationship between the RADIUS server 100, and the access point and the user terminal 500 as described in this embodiment is similarly applicable to the relationship between the RADIUS server 100, and the access point and the user terminal 500 as shown in FIG. 1.

As described above, according to the RADIUS server (authentication server) of this embodiment, (1) the shared key (the encryption key shared between the server and the access point) is associated with the information (NAS-ID) for specifying the access point. For that reason, the key can be appropriately managed even under the environments of the general DHCP allocation. (2) Plural groups (outsourcing party) can be managed by one authentication server. (3) The user and group which are capable of logging on can be set for each AP. (4) Plural certificates can be managed by one RADIUS server. Also, the certificate of the plural groups different in the authentication station can be conducted by one RADIUS server.

The present invention can be implemented in various other configurations without being out of the sprit or the main features of the present invention. For that reason, the above embodiments are only examples in various viewpoints and should be not definitely interpreted.

INDUSTRIAL APPLICABILITY

According to the present invention, an advertisement can be distributed to customers who satisfy a given condition including a customer who has utilized the radio LAN access point in the past but does not utilize the radio LAN access point.

Also, a motivation of locating the access point is increased because advertisement distributing unit to be provided is appealing (flexible in settings of distribution time and distribution target) for a person who intends to install an access point such as a restaurant owner.

Also, a service provider can obtain an advertisement fee incoming.

The service provider can obtain the advertisement fee incoming, thereby making it possible to cover the network maintenance cost by the advertisement fee, and to constitute the advantageous access point economically (for example, the free usage fee) to the subscriber.

In addition, when the number of access points increases, and the convenience of the subscriber is increased, the following services can be obtained.

The subscriber who does not want to receive the advertisement is received as the pay subscriber, and a part of the rate is returned to the person who intends to install the access point.

The access point that the subscriber can access only to the web site that is free only for a given period of time and thereafter registers the charged service is located, thereby making it possible to make various charged plans such as the time-limited charged (for example, one day or one week) service. As a result, incoming can be obtained other than the advertisement fee.

<Incorporation by Reference>

The disclosures of Japanese patent application No. PCT/JP2003/011554 filed on Sep. 10, 2005 including the specification, drawings and abstract are incorporated herein by reference.

What is claim is:

1. A user position utilization system that allows utilization of information related to a position of a user via an IP network, comprising:
   a memory unit to store information for specifying a date at which a user terminal can communicate within a communication area provided by a given radio LAN access point, information for specifying the access point, and information for specifying the user;
   a table to store a given e-mail address and the information for specifying the user in association with each other; and
   a utilization unit to extract the information for specifying the user who satisfies a predetermined condition from the memory unit, to acquire the e-mail address associated with the information for specifying the user from the table, and to transmit an advertisement mail to the e-mail address.

2. A user position utilization system that allows utilization of information related to a position of a user via an IP network, comprising:
   an authentication station server to transmit authentication information to an e-mail address inputted from a user terminal;
   an authentication unit to receive the authentication information transmitted through an access point from the user terminal that has received the authentication information from the authentication station server, and to execute the certificate on the basis of the authentication information;
   a memory unit to store information for specifying a date at which the user terminal can communicate within a communication area provided by a radio LAN access point, information for specifying the access point, and information for specifying the user;
   a table to store the e-mail address inputted from the user terminal and the information for specifying the user in association with each other; and
   a utilization unit to extract the information for specifying the user who satisfies a predetermined condition from the memory unit, to acquire the e-mail address associated with the information for specifying the user from the table, and to transmit an advertisement mail to the e-mail address.

3. The user position utilization system according to claim 2, wherein the authentication information is an electronic certificate.

4. The user position utilization system according to claim 2, wherein the authentication information is an ID and a password.

5. A user position utilization system that allows utilization of information related to a position of a user via an IP network, comprising:

an authentication station server to create authentication information in a form becoming available through the use of a given password and to transmit the authentication information to an e-mail address inputted from a user terminal;

an authentication unit to receive the authentication information transmitted through an access point from the user terminal that has received the authentication information from the authentication station server, and to execute the certificate on the basis of the authentication information; and a printing unit to print a residence and superscription which are inputted from the user terminal as an address of a direct mail for notifying the user of the given password.

* * * * *